United States Patent

[11] 3,607,349

| [72] | Inventor | John E. Dereich<br>Pittsburgh, Pa. |
|---|---|---|
| [21] | Appl. No. | 839,753 |
| [22] | Filed | May 7, 1969<br>Division of Ser. No. 525,117, Feb. 4, 1966, Pat. No. 3,468,835 |
| [45] | Patented | Sept. 21, 1971 |
| [73] | Assignee | Neville Chemical Company<br>Pittsburgh, Pa. |

[54] PRINTING ON SUBSTRATES SUCH AS GLASS USING EPOXY RESIN INK COMPOSITIONS
7 Claims, No Drawings

[52] U.S. Cl. .................................................... 117/38, 117/45, 117/124 E
[51] Int. Cl. .................................................... C03c 17/32, B44d 1/14, B44c 1/52
[50] Field of Search .......................................... 117/45, 38, 124 E; 260/33.4, 37

[56] References Cited
UNITED STATES PATENTS

| 3,373,131 | 3/1968 | Bolstad et al. ................ | 117/38 X |
| 3,393,167 | 7/1968 | Varron et al. ................ | 117/38 x |
| 3,419,412 | 12/1968 | Morris et al. ................ | 117/38 |
| 3,471,312 | 10/1969 | Muenchinger et al. ....... | 117/38 |

*Primary Examiner*—Robert F. Burnett
*Assistant Examiner*—Roger L. May
*Attorney*—Burns, Doane, Swecker & Mathis ABSTRACT: A thermosetting, normally solid, low melting, resinous printing ink base, which comprises an epoxy resin, a $C_{14}$–$C_{18}$ alkanol such as cetyl or stearyl alcohol, a hardener such as a guanidine compound or an acid anhydride, and a viscosity modifier, is used in high speed printing on substrates such as glass.

PRINTING ON SUBSTRATES SUCH AS GLASS USING EPOXY RESIN INK COMPOSITIONS

This is a division of application Ser. No. 525,117, filed Feb. 4, 1966 and now U.S. Pat. No. 3,468,835.

This invention relates to thermosetting epoxy resin compositions or inks which have a long pot life at temperatures below about 300° F. and cure to a thermoset solid at temperatures between about 350° and 500° F. It further relates to the use of such compositions in forming plastic imprints, labels, designs or coatings on the surface of solid objects such as containers for beverages. In a preferred embodiment, the invention relates to an improved cold printing process wherein a low melting, curable solid organic ink composition is applied in molten form directly to the surface of glass bottles or similar articles, drying almost instantaneously to produce a nontacky surface and permitting the printing of a differently colored ink design thereover.

Glass bottles are commonly labeled or decorated by the use of colored glass frit which comprises fine particles of suitably tinted lead glass mixed or coated with a small amount of a thermoplastic binder such as a hydrocarbon resin or wax or a blend thereof. In such a process the wax-containing glass frit is heated to form a liquid ink of desired viscosity and applied to bottles by a screen printing technique. An electrically heated metal wire screen is employed as a stencil through which a squeegee forces the viscous ink onto the surface of the bottle which is rolled underneath the screen while in contact therewith. The screen used as a stencil is commonly made of stainless steel wire mesh, ranging from about 165 to 300 mesh. The screen is usually backed with a film of a plastic material, such as polyvinyl alcohol, which is resistant to heat and is not attacked by the ink at the printing temperature used, e.g., up to 250° F. Registration of the design on such a screen can be accomplished through a photographic process, as is otherwise well known. The thin film of hot ink thus applied to a cool bottle rapidly solidifies, permitting prompt transfer of the freshly labeled bottle to the next stage of the process without undue risk of smudging the labels. Next the bottle is slowly heated to about 1200° F. in an oven to burn out the organic binder from the imprint and to fuse the imprinted glass frit to the wall of the bottle. Excellent printed labels are produced in this manner but such bottles are becoming less and less competitive with plastic containers on which labels can be printed far more readily than on glass. The main disadvantage of using printing compositions based on glass frit in the labeling of glass bottles is due to the high temperature at which the imprinted glass frit must be fused to the glass bottle and which requires subsequent reannealing of the labeled bottle. This is an expensive operation because it requires a process cycle of many hours, resulting in relative inefficient utilization of expensive equipment.

Organic printing inks have heretofore been proposed for this purpose but have not been found entirely successful because of having too short a pot life, or because of requiring too high application temperatures if sagging and smudging of freshly printed labels was to be avoided, or because of difficulties in obtaining a satisfactory cure. These difficulties have been particularly severe where multicolored labels were desired.

The present invention provides an improved cold printing process for the application of labels to glass bottles, which can be performed using essentially the same equipment as that used with glass frit. It further provides a thermosetting coating composition which has a long pot life at a relatively low working temperature and cures readily at a more elevated temperature, and which can be readily substituted for glass frit in the conventional screen printing process while permitting fixation of the imprinted labels at temperatures substantially below glass fusion temperature. More particularly, it provides a high-speed process for printing labels on glass or the like employing a curable, organic base labeling composition which, like conventional wax-containing glass frit, is preferably a dry, nonsticky solid at room temperature, or which is a nonsagging gel at room temperature, which becomes a readily flowing liquid at temperatures below about 300° F., and which can be overprinted on glass with a differently colored ink.

In its preferred forms, this invention provides a thermosetting, nonsagging coating or ink composition which is a nonsticky solid at room temperature, which melts and acts as a liquid at an application temperature below 300° F., e.g., which has a ring-and-ball softening point in the range between about 100° and 190° F., preferably between about 115° and 190° F.; which has a long pot life at such application temperature; which rapidly forms a solid, abrasion resistant, nonsmudging film or label when imprinted on a cool solid substrate; and which can be rapidly cured, either by itself or after application of a contrasting overprint, to form a hard, adherent, heat and solvent resistant film by heating for about 3 to 30 minutes at a temperature between about 375° and 500° F., preferably for about 5 to 10 minutes between 375° and 450° F. For the purpose of this invention, "long pot life" means that the coating composition can be kept in the liquid state at the application temperature for at least 8 hours without substantial change in color, viscosity, etc. The viscosity at application temperature should be between about 3,000 and 100,000, preferably between about 5,000 and 50,000, most preferably between about 7,000 and 15,000 centipoises.

The present organic base printing composition can be supplied in the form of a low melting, dry solid which, like the known glass frit compositions, can be metered to the printing stage from heated containers as required. To make such a material, the several ingredients are melted and mixed together at a temperature well below the activation temperature of the mix, which is then allowed to cool. The resulting uniform solid mixture is then ground with the desired pigment on a heated three-roll mill or similar device to provide particles having a diameter smaller than about 100 mesh, preferably 165–230 mesh. In any event, any infusible components such as pigments must be ground fine enough to pass through the particular screen size used. However, whereas glass frit inks give best results when supplied in a particle size finer than 325 mesh, a somewhat coarser particle size tends to give optimum results in the present case, especially when printing on a grainy rather than on a smooth glass surface.

Unlike glass frit, the present composition tends to be self-repairing in the curing step in that any pinholes that may have formed in the printing step tend to close up. Unlike normally liquid resinous printing compositions or solutions of the prior art, the normally solid composition of the present invention has the advantage that, while being applied in hot liquid form, it promptly solidifies after being imprinted on the cool glass substrate and immediately becomes nonsmudging. Unlike the solvent containing or the more reactive liquid compositions suggested in the prior art, the present normally solid composition has the further advantages of being easy to mix with desired solid pigments and easy to meter as a low melting solid, and of not drying out on the printing screen due to loss of solvent or premature curing. Unlike related prior art compositions the preferred resinous binder system of the present invention consists essentially of mutually compatible organic ingredients which are solid at room temperature, e.g., at temperatures up to about 100° or 120° F., and which form a stable liquid melt when heated in air at a temperature between about 120° and 190° F. and up to temperatures as high as 300° F. They produce a base print which even before curing has a dry, abrasion resistant, tack free surface. This permits the freshly labeled bottles to be moved around in the equipment and further processed, such as by screening a second color print over the uncured base print, with little risk of marring the print.

According to the present invention, printing compositions having the desired characteristics can be formulated by mixing the following:

a. 100 parts of an epoxy resin or a mixture of different epoxy resins having an epoxide equivalent between about 140 and 4,000, preferably between about 250 and 2,500, and most preferably between about 400 and 1,025, and a softening or melting point between about 150° and 170° F., e.g., Shell "EPON 1001," Ciba "6071," Dow "660," and similar epoxy resins.

b. About 10 to 70 parts, preferably 20 to 35 parts, of a normally solid alkanol of between about 14 and 18 carbon atoms per molecule and having a melting point between about 100° and 140° F. Cetyl alcohol (M.P. 120° F.) is unusually effective but stearyl alcohol (M.P. 138° F.) and the like can also be used.

c. An effective amount, such as 5 to 12 parts, preferably 6 to 8 parts, of a curing agent or hardener capable of effecting the required cross-linking of the epoxy resin at a temperature between about 375° and 500° F. The preferred curing agent is, cyanoguanidine, more often referred to as dicyandiamide ("-dicy"), which has outstanding package stability in contact with reactive epoxy resins and gives excellent pot life at temperatures up to 300° F. However, workable compositions can also be formulated using other known curing agents of the guanidine class. The preferred guanidine compounds, such as dicy, tetramethylguanidine, etc. can be represented by the formula

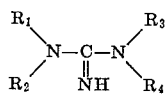

wherein $R_1$, $R_2$, $R_3$ and $R_4$ are the same or different and are selected from the group consisting of hydrogen, cyano, $C_1$ to $C_3$ alkyl groups and $C_1$ to $C_3$ hydroxyalkyl groups. The corresponding bis-compounds, such as biguanide ($NH_2 \cdot CNH \cdot NH \cdot CNH \cdot H_2$) and heptamethylisobisguanide are also usable. Furthermore, solid anhydrides of polycarboxylic acids which are well-known curing agents for epoxy resins and which do not unduly raise or reduce the melting point of the composition, such as hexahydrophthalic anhydride, are also usable. However, the anhydrides have the disadvantages of being required in greater concentrations, and also of being more moisture sensitive and often costlier than the guanidine compounds.

And (d) about 10 to 25 parts, preferably about 10 to 18 parts, of a viscosity modifier which is soluble in the epoxy resin formulation as well as the the alkanol, has a sharp melting point between about 100° F. and 150° F., preferably between 105° and 120° F. (to enhance freedom from tack on the bottle immediately after screening), and does not impair the final cure of the composition. When using dicy as the curing agent, phenyl salicylate (salol) is outstanding because it assures complete solution of dicy in the epoxy resin formulation whereas otherwise dicy is insoluble in the common materials used in epoxy formulations. Benzophenone is another good viscosity modifier for use with dicy-containing compositions, though not as effective as phenyl salicylate.

Another usable viscosity modifier is triphenyl phosphate, but it is more useful in formulations employing an acid anhydride curing agent. When used in a formulation employing a basic type curing agent such as dicy, the ability of the formulation to cure tends to diminish with time.

In addition to the resin-forming solid organic ingredients, the composition will of course usually contain varying amounts, e.g., 0.5 to 60 percent, but preferably not more than about 40 percent (based on total weight of the composition), of the conventional nonreactive, normally solid, organic or inorganic ink ingredients such as pigments or dyes. Particularly useful pigments are titanium dioxide, copper phthalocyanine (Monastral blue), monoazo dyestuffs such as Victoria Maroon, iron oxide reds, chrome green, chrome yellow, suitably tinted glass frit, etc. Small amounts, usually less than 5 percent, of known gellants or high temperature viscosity stabilizers may also be included. silica as well as compounds of bentonite or hydrous silicate montmorillonite with an organic base, e.g., dimethyldioctadecyl ammonium bentonite or similar tetraalkyl ammonium compounds, have been found to be particularly beneficial, The inclusion of trace amounts of antiblocking agents such as polyamide waxes, and of wetting agents such as vinyl silanes or siloxanes which can improve the spreading of the organic ink on the glass substrate, can also be useful in accordance with otherwise well-known practice. Particularly in cases where an overprint is applied over a base coat it can be advantageous to include the same kind of wetting agent, such as a siloxane, in both the overprint ink and in the base coat ink so as to assure good mutual wetting and adhesion between the two ink coats.

The optimum proportions of the several ingredients described above may vary somewhat within the ranges suggested above depending in the specific ingredients used and process conditions to be met, as well as on the final film properties desired, and are readily determined by preliminary empirical testing.

In addition to the principal ingredients described above, appropriate auxiliary amounts of still other materials or additives of the kinds known to be useful in epoxy resin type coating compositions may also be included in the present compositions. For instance, epoxidized linseed oil or other compatible plasticizers may be included to enhance film flexibility. Adhesion between the epoxy coating and the glass substrate can be enhanced by inclusion in the composition of a small amount, for instance, between 0.1 percent to 1.0 percent, of one of the commercially available reactive silanes such as gamma-amino propyl trimethoxy silane, gamma-amino propyl triethoxy silane, gamma glycidoxy propyl trimethoxy silane, etc.

If a particularly hard surface or if enhanced sheen is desired upon curing, the base composition may also include a hard synthetic wax that is compatible with the formulation used, e.g., a polyamide wax. "Rosswax 141," which has a melt point of 141° C. and is made by the Frank B. Ross Co., Jersey City, N.J., is an example of a suitable commercial polyamide wax. Up to 5 or 10 parts of such a wax can be used per 100 parts of epoxy resin.

When a multicolored label is desired, a top coat of different color is printed over the base coat described earlier herein. In such a case it is preferable that the ink composition used in forming the overprint have a substantially lower melting point than the base coat, so as to permit applying the top coat in molten form at a temperature at least about 10° F. lower than the melting point of the base coat. Moreover, the top coat should be curable simultaneously with the base coat, to avoid the necessity for a double cure. For this reason, the resin system used in formulating the top coat should be chemically compatible with the base coat, i.e., it should preferably contain the same kind of reactive materials as the base coat. However, while it is preferred to use a base coat which gives a dry, solid coating promptly after application and cooling, a good quality overprint can be made from compositions which produce a coat that is tacky at room temperature. Accordingly, the overprint composition may be relatively low melting solid or even a thixotropic gel at room temperature. The desired low melting point can be obtained in a variety of ways. For instance, one can use a relatively low melting epoxy resin, or a mixture of a high melting and a low melting or liquid epoxy resin. In addition, one may also increase the concentration of the low melting viscosity modifier in the mixture.

In making the ink compositions of the present invention, the selected ingredients may be mixed in the solid state by grinding in a ball mill or by blending them in powder form. It is preferred, however, to blend the epoxy resin or resins with the alkanol and modifier by heating and mixing these ingredients together at a temperature sufficient to form a fluid melt, e.g., about 180° to 200° F., and allowing the resulting blend to cool to about 145° to 160° F. before adding and mixing in the curing agent, gelling agent and other materials, Solid fillers or pigments may be incorporated into the molten organic ingredients on a heated three-roll mill and ground to the desired particle size in an otherwise conventional manner.

The alkanol and other low melting modifier used in the mixture act as a flux for the formulation when melted, minimize stickiness of the formulation when cold and also can contribute to its hardness when cold. Without such a flux the formulation will not form a melt of a quality which is satisfactory for printing.

The epoxy resins useful in the present invention are well-known commercial products obtained by condensing a polyhydric phenol such as 2,2-bis(p-hydroxyphenyl)propane with an excess of a 1,2-epoxy-3-halohydrin such as epichlorohydrin so as to provide a solid resin having a softening point in the aforementioned temperature range. Other polyhydric phenols or bisphenols useful in the preparation of suitable epoxy resins include bis(p-hydroxyphenyl)methane as well as trihydric phenols such as 3,4-di-(p-hydroxybenzyl)phenol. The resins which may be used in this invention have a 1,2-epoxy equivalency greater than 1.0, i.e., the average number of 1,2-epoxy groups contained in the average molecule of the resinous reaction product is greater than one, or, put differently, the resin contains an epoxide equivalent in the range between about 140 and 1,025, preferably between about 200 and 600. By "the epoxide equivalent," reference is made to the grams of the polymeric resin containing 1 gram equivalent of epoxide. An excess of epichlorohydrin is generally used in producing the normally solid resins. The epoxy resins themselves, as well as various methods for their preparation are well known and are described, for instance, in U.S. Pat. Nos. 2,765,288; 2,965,610 and 3,062,771 among many others.

Other types of epoxy resins having the required properties can also be used. These may include, for instance, epoxidized polybutadiene resins; epoxy phenolics, which are blends of a phenol-formaldehyde resin with the above-described "bis-epi" type of epoxy resin; as well as epoxy novolacs such as "Dow DEN 438," that is, epoxy resins obtained by reacting epichlorohydrin with a phenol-formaldehyde novolac.

As an example, a commercially available solid resin ('-'EPON 1001," made by Shell Chemical Co.), of the epichlorohydrin/-bisphenol-A type is typical of the relatively high melting resins which are well suited for use in the basic coat herein. This epoxy resin has the properties summarized in Table I.

TABLE I

SPECIFICATIONS FOR TYPICAL SOLID EPOXY RESIN

| | |
|---|---|
| Melting Point [1] | 160°–165° F. |
| Color, 77° F. (Gardner) [2] | 4 Max. |
| Viscosity [3], 77° F. | 1.0–1.7 Poise (D–G Gardner-Holt) |
| Epoxide Equivalent [4] | 475–525 |
| Avg. Molecular Weight | 900 |
| Equivalent Weight (g. resin to esterify 1 mole of acid) | 145 |
| Hydroxyl Content equiv. OH/100 g. resin | 0.28 |
| Bulk density of flaked material | 35–40 lb./cu.ft. |
| Weight per gallon 68° F. (void-free) | 9.9 lb. |

[1] Durrans' Mercury Method, SMS 114.
[2] ASTM D 1544-585; 40% solution in butyl carbitol.
[3] Bubble-Tube Method (ASTM D-154).

Commercial epoxy resins substantially equivalent to "EPON 1001" and well suited in formulating the base coat compositions herein are Resin "520/520C" made by the Jones Dabney Company, "D.E.R. 660" made by the Dow Chemical Company, "Ciba 6071" made by Ciba Chemical Company, and many others.

"EPON 828" is a commercial epoxy resin of similar composition as the epoxy resins described above, but is a liquid at room temperature. Either by itself or mixed with a higher melting resin, it can be used in formulating the relatively low melting top coat suitable for printing over the base coating. Similar low melting epoxy resins are commercially available as Dow D.E.R. 331, Ciba 6010, Reichhold 37–140, etc.

The printing process of the present invention can be carried out on equipment now used in printing labels or decorative designs on glass by the conventional glass frit process. For instance, in carrying out the novel process the novel resinous labeling composition, after being heated to a temperature above its melting point, may be applied to glass by spraying through a stencil or, preferably, by a printing process of the silk screen type. In such a process the desired pattern, label or design is cut in a clothlike stainless steel mesh screen which is backed with an impervious plastic film, and the molten labeling composition is then squeezed through the unbacked section of such a screen directly onto a bottle or other glass object which is brought in contact with the screen. The metal screen, being an electrical resistor, can be conveniently maintained at the desired temperature, e.g., between about 130° and 200° F., by passing electric current of appropriate intensity through it. With the particular equipment used, voltage regulator setups of between 15 and 29 volts produced the desired screen temperatures. At the point of use, on the screen, the labeling composition desirably has a viscosity of about 5,000 to 50,000 cps., i.e., it has a consistency such that it does not readily pass through the design cut in the screen except when it is positively forced through it by means of a squeegee or flexible wiper blade passing over the screen. The labeling composition itself may be supplied to the screen in hot liquid form from an adjacent reservoir which is maintained at an appropriate temperature.

The resulting print solidifies almost instantly, that is, usually in less than 1 second after application to the bottle which is substantially at room temperature (60°–90° F.). Consequently, as soon as the glass bottle is imprinted and rolls away or is withdrawn from the printing stage it is substantially dry to the touch and can be passed to the next stage, e.g., to receive a contrasting coat of ink in a subsequent printing stage and then be cured in a baking oven. Bottles imprinted with the base coat of this invention can be held in storage for later processing, or otherwise handled in the uncured state without risk of smearing.

The quality of being dry and smearproof is particularly important when the base coat must receive a contrasting overprint. With proper equipment it is possible to print more than 100 bottles per minute, and in many instances more than 200 per minute, when using the present invention.

The bottles bearing the imprinted label, which may comprise a single coat or a series of successive coats formed from compositions having progressively lower melting points, are finally passed to a baking oven where they are heated at a temperature between about 400° and about 500° F. for about 4 to about 20 minutes, preferably for from 5 to not more than 10 minutes, cooled in air and are then immediately ready for use. Excellent high gloss labels resistant to immersion in water, dilute alkali solutions, detergent solutions and organic solvents such as acetone are thus produced in a very effective and economical way.

The invention is further illustrated by the following specific examples. Unless otherwise indicated, all amounts and proportions of materials are expressed on a weight basis throughout this specification and the appended claims.

Example 1

A solid base coat ink composition was formulated by blending the following:

| | |
|---|---|
| "EPON 1001" Epoxy Resin | 70.0 parts |
| Cetyl alcohol | 22.5 parts |
| Salol | 7.5 parts |
| Dicy | 5.0 parts |
| Bentonite-organic base gellant [1] | 3 parts |
| Silane coupling agent [2] | 1.0 parts |
| TiO$_2$ pigment | 60.0 parts |

[1] Dimethyl dioctadecyl ammonium bentenite ("Bentone 27").
[2] Gamma-amino propyl trimethoxy silane.

This ink composition was used to print the usual type of labels on conventional colorless glass soft drink bottles. An electrically heated, 200-mesh stainless steel screen was used as the stencil. The screening voltage used was about 25 volts, corresponding to a screen temperature of about 175° F. A sharply defined print was produced which was tack free at room temperature. Upon curing the bottle in an air oven at 450° F. for 6 minutes, a strongly adherent infusible and solvent resistant label was produced. The label was as sharply defined after curing as before, indicating that the ink did not sag during the high temperature cure.

Example 2

Another base coat ink composition used had the following composition:

| | |
|---|---|
| "EPON 1001" Epoxy Resin | 70 parts |
| Cetyl alcohol | 15 parts |
| Salol | 10 parts |
| Polyamide wax ("Rosswax 141") | 5 parts |
| Dicy | 5 parts |
| Gellant (1) | 4 parts |
| Silane (2) | 1 parts |
| TiO₂ pigment | 50 parts |

1 Same as in Example 1.
2 Same as in Example 1.

This ink was used to print labels on bottles as described in Example 1, except that a somewhat higher screening temperature (about 185° F.) was used and the curing cycle was 8 minutes at 450° F. The freshly printed labels were tack free at room temperature and had a waxlike sheen upon curing. Except for the higher sheen they were similar to the labels obtained in Example 1.

Example 3

Still another base coat ink was formulated as follows:

| | |
|---|---|
| "EPON 1001" Epoxy Resin | 70 parts |
| Cetyl alcohol | 20 parts |
| Benzophenone | 10 parts |
| Dicy | 5 parts |
| Gellant (1) | 3 parts |
| Silane (2) | 1 part |
| TiO₂ pigment | 40 parts |

1 Same as in Example 1.
2 Same as in Example 1.

Again the same printing technique was employed, using a screening voltage of 26–27 volts (about 180° F.). The fresh print was tack free at room temperature. It was satisfactorily cured in a curing cycle of 6 minutes at 450° F. Labels produced were of similar quality as those produced in Example 1, but the salol-containing ink compositions of Examples 1 and 2 were somewhat easier to use than the benzophenone-containing ink of Example 3.

Example 4

The ink composition in this example had the following composition:

| | |
|---|---|
| "EPON 1001" Epoxy Resin | 72.7 parts |
| Cetyl alcohol | 18.2 parts |
| Triphenyl phosphate | 9.1 parts |
| Dicy | 5.0 parts |
| TiO₂ pigment | 6.0 parts |

This ink was printed on the bottles in the same manner described in Example 1, except that screening voltage was set at 29 volts (about 190° F.). Good cured labels were obtained when freshly prepared ink was used. However, when the same ink was used after having been stored for a week at room temperature, a satisfactory cure of the labels was difficult to obtain. No such difficulties were encountered when using salol or benzophenone as the viscosity modifier, and inks containing salol or benzophenone are therefore preferred. It appears that ink compositions containing triphenyl phosphate as the viscosity modifier were chemically less stable.

Example 5

Example 4 was repeated except that stearyl alcohol (M.P. 138° F.) was substituted for cetyl alcohol (M.P. 120° F.). Because of the somewhat more viscous nature of the resulting ink composition it required a somewhat higher screening temperature (about 195° F.) for optimum results. Otherwise, the process performance of this ink and the quality of the resulting labels were substantially the same as in Example 4.

Example 6

This example shows the production of two-color labels. To accomplish this, the white base coat produced in Example 1 (uncured) was overprinted with a lower melting ink containing iron oxide red as the pigment. The overprint ink had the following composition:

| | |
|---|---|
| "EPON 828" Liquid epoxy resin (1) | 80 parts |
| 1,6-Hexanediol | 20 parts |
| Dicy | 5 parts |
| High Temperature gellant ("Bentone 27") | 3 parts |
| Iron oxide pigment | 40 parts |

1 Epoxide equivalent 180–195.
2 Gardner viscosity 150 poises at 25° C.

The alkane diol, when added in a proportion of between about 10 to 40 parts per 100 parts of epoxy resin, serves as a gelling agent at low temperature, keeping the normally liquid epoxy resin from running down the side of the bottle at room temperature. The high temperature gellant further helps to keep the ink from running during the curing cycle without unduly increasing the ink viscosity in the printing stage. The ink screened well through a 200-mesh stainless steel screen at 15 volts (about 120° F.). The overprint, of course, was somewhat sticky before curing. The two-coat labels were satisfactorily cured in a single curing cycle of 10 minutes at 450° F., producing a hard mat overprint over the glossy base.

Example 7

The production of a glossy overprint is facilitated by using a blend of a normally solid, high melting epoxy resin and a lower melting epoxy resin. This permits achieving a low screening temperature and still maintain a high epoxide equivalent. The following is illustrative of this kind of ink composition:

| | |
|---|---|
| "EPON 1001" Epoxy Resin (1) | 50 parts |
| "Dow D.E.R. 732" Epoxy Resin (2) | 50 parts |
| Dicy | 5 parts |
| Bentone 27 | 4 parts |
| Silane (3) | 1 parts |
| Solfast Blue RNC (Sherwin Williams) pigment | 5 parts |
| TiO₂ | 1 parts |

1 Epoxide equivalent 425–500.
2 Epoxide equivalent 300–325; Viscosity 55–100 cps. at 25° C.
3 Same silane as in Example 1.

This ink was applied as an overprint on the uncured white base coat described in Example 2. The overprint screened well at about 120° F. Bottles bearing the resulting two-color labels were cured satisfactorily using a curing cycle of 9 minutes at 450° F. Both the base coat and the overprint gave a hard glossy surface upon curing.

Example 8

A resin composition having the properties of a thixotropic gel was formulated from the following:

| | |
|---|---|
| "EPON 1000" Epoxy Resin (Solid) | 49.0 parts |
| "EPON 828" Epoxy Resin (Liquid) | 21.0 parts |
| Cetyl Alcohol | 12.5 parts |
| Phenyl Salicylate | 17.5 parts |
| Dicy | 5.0 parts |
| Silane coupling agent [1] | 0.1 parts |
| Dow Corning No. 200 Fluid (Silicone) | 0.2 parts |

[1] Same as in Example 1.

This composition was prepared by first heating together the epoxy resins, the alcohol and the phenyl salicylate until a clear solution was obtained (at about 180° F.). The clear solution was then allowed to cool to 150°–160° F. and in this temperature the remaining ingredients were added while stirring. The resulting mixture was a thixotropic gel having a ring-and-ball softening point of about 111° F.

Upon addition of pigment this composition gives an ink which, while tacky at room temperature, is suitable for stenciling at elevated temperatures, e.g., at 150° F. When applied as an overprint on a glass bottle over a composition such as that described in Example 1, a satisfactory, simultaneous cure of both coats is obtained on treating the bottle in any suitable curing cycle, e.g., by heating it in an air oven at 450° F. for 6 minutes.

While the invention herein has been described with particular reference to an improvement in the art of printing on glass, the novel compositions are also of value in many other fields where it is advantageous to use a latent curing, normally solid resin having a long pot life or thermoplastic time at some intermediate temperature and acting as a thermosetting resin at a higher temperature so as to form an infusible solid by heating at such higher temperatures. For example, the novel compositions can be used to bind preimpregnated glass roving, cloth, fiber or mat which can be thermoset at any later time by subjecting it to a higher temperature. The modified epoxy resin system of this invention likewise offers important advantages where the short pot life of a conventional epoxy system limits the working time of the formulation, as where a part is impregnated, vacuum treated to remove air bubbles at a temperature high enough to allow a fluid resin, and then must be formed before the resin gels.

Furthermore, the long pot life of the novel compositions at 200 F. provides a fluid that can be easily spread over the desired area of wooden, metal, ceramic or glass part or substrate for use as an adhesive without use of any volatile solvents, and then cured by any suitable method such as induction heating, resistance heating, oven baking, and the like. This allows parts to be coated with a nonsticky film which is a latent adhesive, to be joined to another part at a later date or at a different stage or place of manufacture. In a similar fashion, the composition can be applied to a substrate to serve as a permanent protective or decorative coating thereon, and to receive an overprint which is cocurable with the base coating. The novel compositions are also especially useful in the application of coatings by the fluidized bed technique wherein the coating resin formulation requires good flow characteristics during the coating step, final cure being obtained by subsequent baking or heating as described. The substrate to which the resinous composition of this invention can be applied may be any solid material which is substantially nonreactive and capable of being heated to a temperature of at least about 375° F. for a sufficient length of time to effect the desired cure of the coating without causing any undesirable change in the substrate itself.

Amounts and proportions of materials are expressed in this specification on a weight basis unless otherwise indicated.

The foregoing description of the invention and of the manner and processes of making and using it, including examples illustrative of the best mode of carrying it out, will enable persons skilled in the art to make and use the described invention as well as its variations and modifications which have not been described, but which nevertheless fall within its scope and spirit. The subject matter which is regarded as the invention is particularly pointed out in the appended claims.

What is claimed is:

1. A cold color printing process which comprises
   i. applying to a surface of a cool, heat-resistant solid substrate a first coating of a normally solid, high melting ink composition at a temperature above its melting point and below about 190° F., said normally solid composition comprising
      a. 100 parts of a normally solid, fusible epoxy resin which melts at a temperature between about 125° and 200° F., and which has an epoxide equivalent of between about 140 and 4,000;
      b. 10 to 70 parts of $C_{14}$ to $C_{18}$ alkanol which melts at a temperature between about 100° and 140° F.;
      c. an effective amount of hardener adapted to cause cross-linking of said epoxy resin upon heating; and
      d. 10 to 25 parts of viscosity modifier which has a sharp melting point at a temperature between about 100° and 150° F., is compatible with the epoxy resin and the alkanol and does not degrade the thermosetting properties of the composition, said modifier being selected from the group consisting of phenyl salicylate, benzophenone and triphenyl phosphate; and
   ii. heating the resulting imprinted substrate surface at a curing temperature between about 375° and 500° F. for a period of about 3 to 30 minutes until the ink is cured to form a cross-linked adherent, infusible resinous film.

2. A process according to claim 1 wherein the heating step (ii) is conducted at a temperature between about 375° and 475° F. for from about 5 to less than 10 minutes.

3. A process according to claim 1 wherein said ink is applied to the substrate surface through a heated metal screen stencil.

4. A process according to claim 1 wherein the ink comprises cetyl alcohol as the alkanol, phenyl salicylate as the viscosity modifier, and dicyandiamide as the hardener.

5. A process according to claim 1 wherein, prior to said heat curing step, a second ink of contrasting color which melts at a temperature at least 20° F. lower than said first ink and is cocurable therewith is applied as a liquid over said first ink film at a temperature below the melting point of the latter to form a multicolored label.

6. A process for providing a glass container with an infusible resinous surface label which comprises
   a. printing a coating of a normally solid, fusible, cold color ink composition in a predetermined pattern on a cool surface of said container at a temperature above the melting point of said ink and below about 190° F., said composition being composed essentially of (1) 100 parts of a normally solid fusible epoxy resin which melts at a temperature between about 125° and 200° F. and has an epoxide equivalent of between about 140 and 4,000, (2) 10 to 70 parts of an alkanol which has a melting point between about 100° and 140° F., (3) about 5 to 12 parts of dicyandiamide, (4) 10 to 25 parts of a viscosity modifier selected from the group consisting of benzophenone and phenyl salicylate, and (5) about 0.5 to 60 percent based on the weight of the composition of a nonreactive pigment; and
   b. heating the imprinted container at a temperature between about 375° and about 500° F. for a period of about 3 to 30 minutes until said coating is cured to form a cross-linked adherent solid infusible film.

7. A process for forming an infusible resin coating on a predetermined cool, portion of a glass substrate, which process comprises
   a. applying a film of a first, normally solid, fusible ink composition to said predetermined substrate portion at a temperature above the melting point of said composition and below about 200° F., said composition consisting essentially of (1) 100 parts of a normally solid, fusible epoxy resin which melts at a temperature between about 150° and 165° F. and has an epoxide equivalent of between about 475 and about 525, (2) 20 to 35 parts of cetyl alcohol, (3) 10 to 25 parts of phenyl salicylate, (4) 5 parts dicyandiamide, and (5) 0.5 to 60 percent based on total weight of ink composition of a nonreactive pigment;

b. overprinting said coating at a printing temperature below its melting point with a second cold color ink composition which is liquid at said printing temperature and is cocurable with said first ink composition; and c. heating the coated substrate in a curing zone at a temperature between about 375° and 450° F. for a period of from about 3 to 10 minutes.